Figure 1:
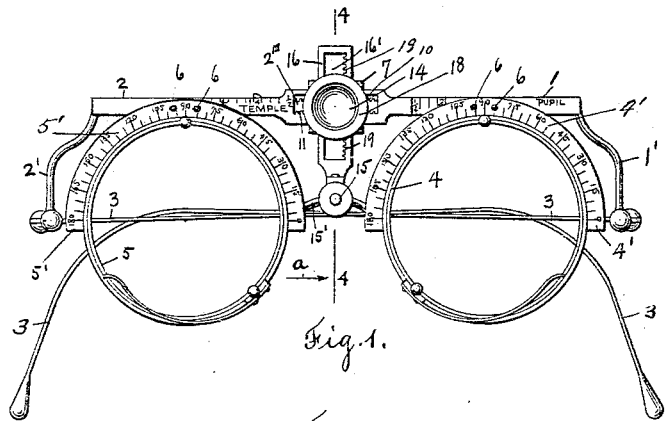

(No Model.)

G. W. WELLS.
OCULIST'S TESTING FRAME.

No. 555,195. Patented Feb. 25, 1896.

Witnesses
Chas. F. Schnell
Katie Farrell

Inventor
George W. Wells.
By Attorney
John C. Dewey

United States Patent Office.

GEORGE W. WELLS, OF SOUTHBRIDGE, MASSACHUSETTS, ASSIGNOR TO THE AMERICAN OPTICAL COMPANY, OF SAME PLACE.

OCULIST'S TESTING-FRAME.

SPECIFICATION forming part of Letters Patent No. 555,195, dated February 25, 1896.

Application filed January 3, 1894. Serial No. 495,522. (No model.)

*To all whom it may concern:*

Be it known that I, GEORGE W. WELLS, a citizen of the United States, residing at Southbridge, in the county of Worcester and State of Massachusetts, have invented certain new and useful Improvements in Oculists' Testing-Frames; and I do hereby declare that the following is a full, clear, and exact description thereof, which, in connection with the drawing making a part of this specification, will enable others skilled in the art to which my invention belongs to make and use the same.

My invention relates to testing or trial frames used by oculists in fitting eyeglasses or spectacles, and particularly to that class of testing-frames in which a bar extends the entire length of the top of the frame, with the temples jointed to the ends of said bar, and with the lens-holding frames provided with revolving lens-holders attached to said bar; and the object of my invention is to improve upon the construction of testing-frames of the class above referred to and to provide a testing-frame of extreme lightness in which the temples, as well as the lens-holding frames, may be adjusted to vary the width between the temples, and in which both the temples and the lens-holding frames are attached to the main or connecting bar of the frame, which extends the entire length of the top of the frame, and in which the adjusting-rod, which is provided with a right and left hand thread, ordinarily used for adjusting the lens-holding frames, is dispensed with, and the adjustment of the lens-holding frames and of the temples is done simultaneously by the operator from the front of the frame.

My invention consists in certain details of construction of an oculist's testing-frame, and more particularly in making the main or connecting bar in two parts, consisting of two straight flat bars extending nearly the full width of the frame and adjustable on each other longitudinally to simultaneously adjust the lens-holding frames and the temples attached thereto. The adjoining ends of the two bars forming the connecting-bar are perforated and each provided with a rack on one edge of the perforation and are moved by a pinion meshing with both racks to move the bars away from each other or toward each other, to adjust the lens-holding frames and the temples without the use of the ordinary adjusting-rod provided with a right and left hand thread, as will be hereinafter described.

Figure 2:
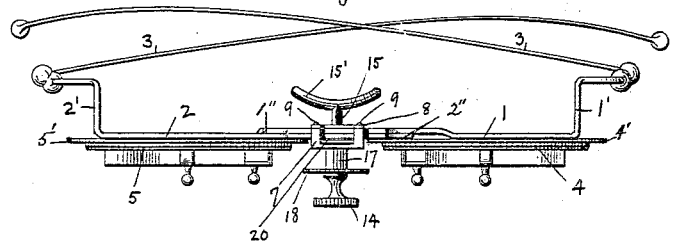
Figure 3:
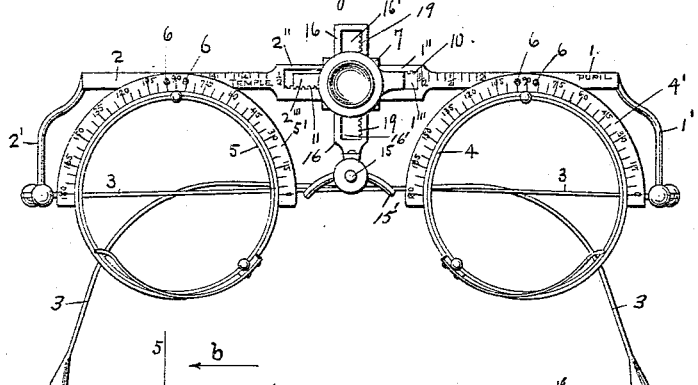
Figures 4, 5:
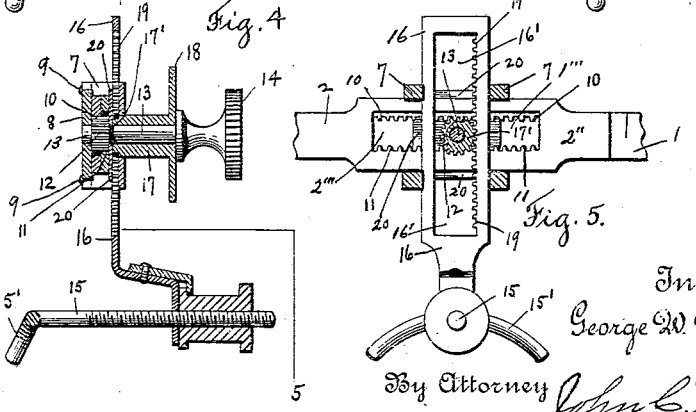

Referring to the drawings, Figure 1 is a front view of an oculist's testing-frame embodying my improvements with the lens-holding frames and temples moved toward each other. Fig. 2 is a plan view of the frame shown in Fig. 1. Fig. 3 corresponds to Fig. 1, but shows the lens-holding frames and the temples moved away from each other. Fig. 4 is, on an enlarged scale, a cross-section on line 4 4, Fig. 1, looking in the direction of arrow $a$, same figure; and Fig. 5 is a section on line 5 5, Fig. 4, looking in the direction of arrow $b$, same figure.

In the accompanying drawings the main or connecting bar of the frame consists of two straight flat bars 1 and 2, having their upper edges extending in the same horizontal plane to form the top of the frame and with their inner ends overlapping in a vertical plane and adapted to slide on each other longitudinally to lengthen or shorten the frame. The outer ends of the bars 1 and 2 extend rearwardly and downwardly, and to the lower ends of the depending arms 1' and 2' are jointed the temples 3, which move with said bars to adjust the temples and vary the width between them, according as the testing-frame is used on a narrow or a wide face.

The two lens-holding frames 4 and 5 may be of ordinary construction, and are provided with revolving lens-holders to turn the lens and with flat portions or segments 4' and 5', which are graduated in the usual way, as shown. Said frames 4 and 5 are attached to the front of the bars 1 and 2 intermediate the rearwardly-extending ends and the perforated portions in this instance by rivets 6, and move with said bars.

The bars 1 and 2 are provided at their inner ends with the perforated portions 1" and 2", which overlap each other and are supported in a block 7, loosely mounted on said portions 1" and 2". The plate 8, secured to the rear of said block 7 by screws 9, retains the bars 1 and 2 in their proper positions in said block 7.

The oblong openings or perforations 1''' and 2''' in the inner ends 1'' and 2'' of the bars 1 and 2 are provided, one, as 1''', with a rack or teeth 10 on its upper edge, and the other, as 2''', with a rack or teeth 11 on its lower edge, both of which racks 10 and 11 are engaged by a pinion 12, gearing into the same and fast on the spindle 13 of the knob 14, which projects from the front of the frame. The turning of the knob in one direction will cause, through the pinion 12 engaging the racks 10 and 11, the bars 1 and 2 to move apart or away from each other, and the turning of the knob 14 in the opposite direction will cause them to move toward each other, thus adjusting the lens-holding frames 4 and 5 and the temples 3 attached to said bars.

The adjustable nose-piece consists, in this instance, of the horizontal adjustable rod 15, provided with the forked inner end 15'. Said rod 15 is adjustably supported in the lower end of the bar 16, which is supported and has a vertical movement in the block 7 by a pinion 17' on a sleeve 17, loosely mounted on the spindle 13 of the knob 14. Said sleeve 17 is provided with a disk 18 for turning the same. The pinion 17' engages a rack or teeth 19 on one edge of the oblong opening or perforation 16' in the bar 16. A thin plate 20 extends between the pinions 12 and 17' directly back of the bar 16 within the block 7.

The front of the bars 1 and 2 may be marked or graduated, as shown, to give the pupilary and the temple distance.

From the above description, in connection with the drawings, the operation of my testing-frame will be readily understood by those skilled in the art.

The advantages of my improved testing-frame will be readily appreciated by those skilled in the art. It is of simple construction and very much lighter than the ordinary testing-frame provided with revolving lens-holders. The adjusting-rod provided with a right and left hand thread is dispensed with, and the adjustment of the lens-holding frames to ascertain the pupilary distance and also the adjustment of the temples is done by the operator from the front of the frame.

It will be understood that the details of construction of some of the parts of my testing-frame may be varied somewhat, if desired.

Having thus described my invention, what I claim as new, and desire to secure by Letters Patent, is—

An oculist's testing-frame, consisting of two flat bars, having their upper edges extending in a horizontal plane, to form the top bar of the frame extending nearly the full width of the frame, and their outer ends bent rearwardly and downwardly to form downwardly-extending arms, to which the temples are jointed, and their inner ends overlapping, and adapted to slide longitudinally on each other, and each provided with an oblong opening or perforation therein, having a rack or teeth on one edge thereof, and two circular lens-holding frames, one attached to each bar intermediate the opening therein and the rearwardly-extending portion thereof, and means for moving said bars to adjust the lens-holding frames and temples, consisting of a pinion engaging said teeth, and a knob for turning said pinion, located at the front of the frame, in combination with a nose-piece supported and vertically adjustable in a block connecting the ends of said two bars, and said block, and means for vertically adjusting said nose-piece, substantially as shown and described.

GEORGE W. WELLS.

Witnesses:
ALBERT B. WELLS,
CHANNING M. WELLS.